Nov. 19, 1940.  A. F. INDRIERI  2,222,100
SPRING MOTOR
Filed May 1, 1939  4 Sheets-Sheet 3
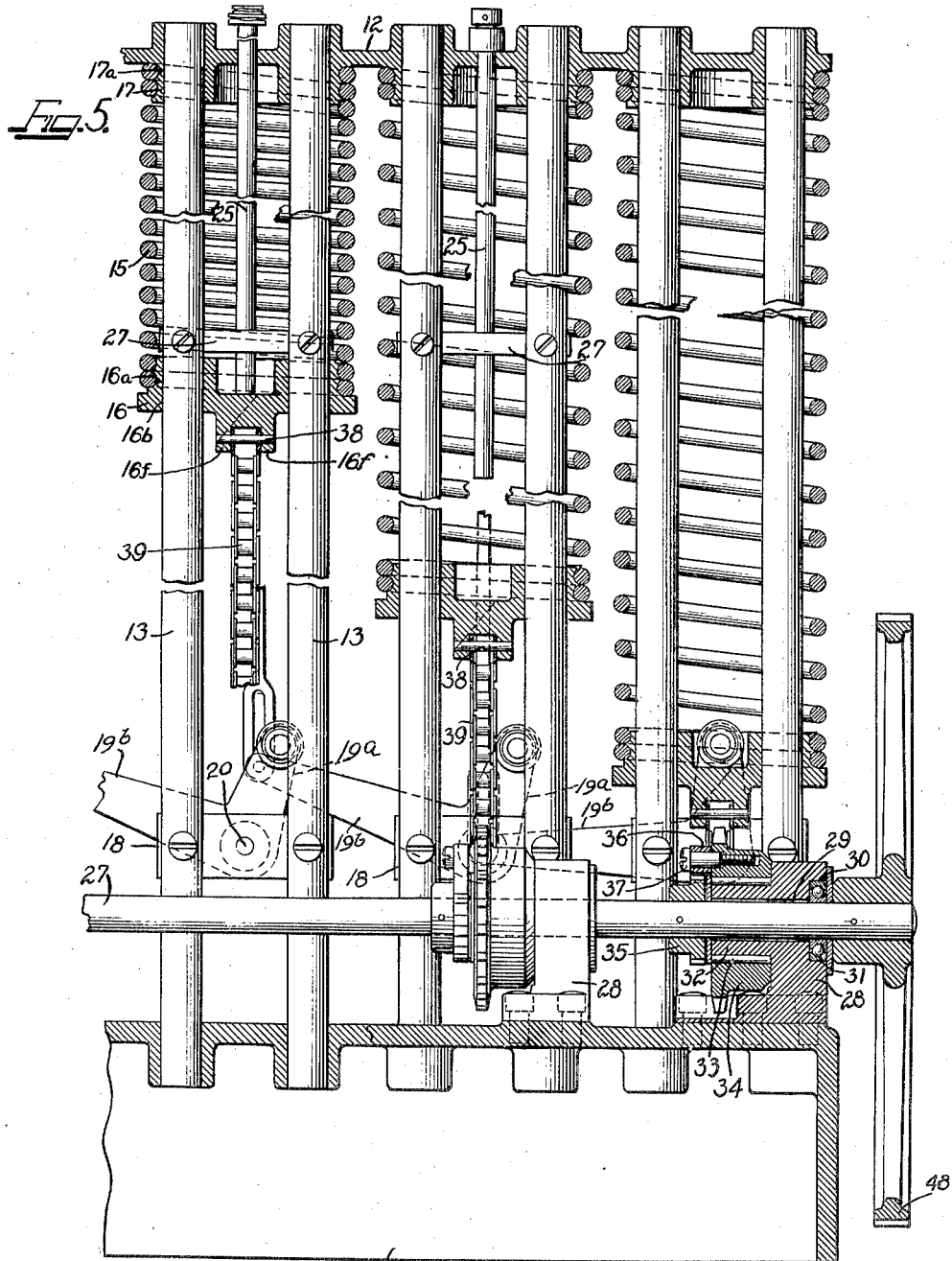
Inventor
ALEXANDER F. INDRIERI
By Charles O'Neill Attys

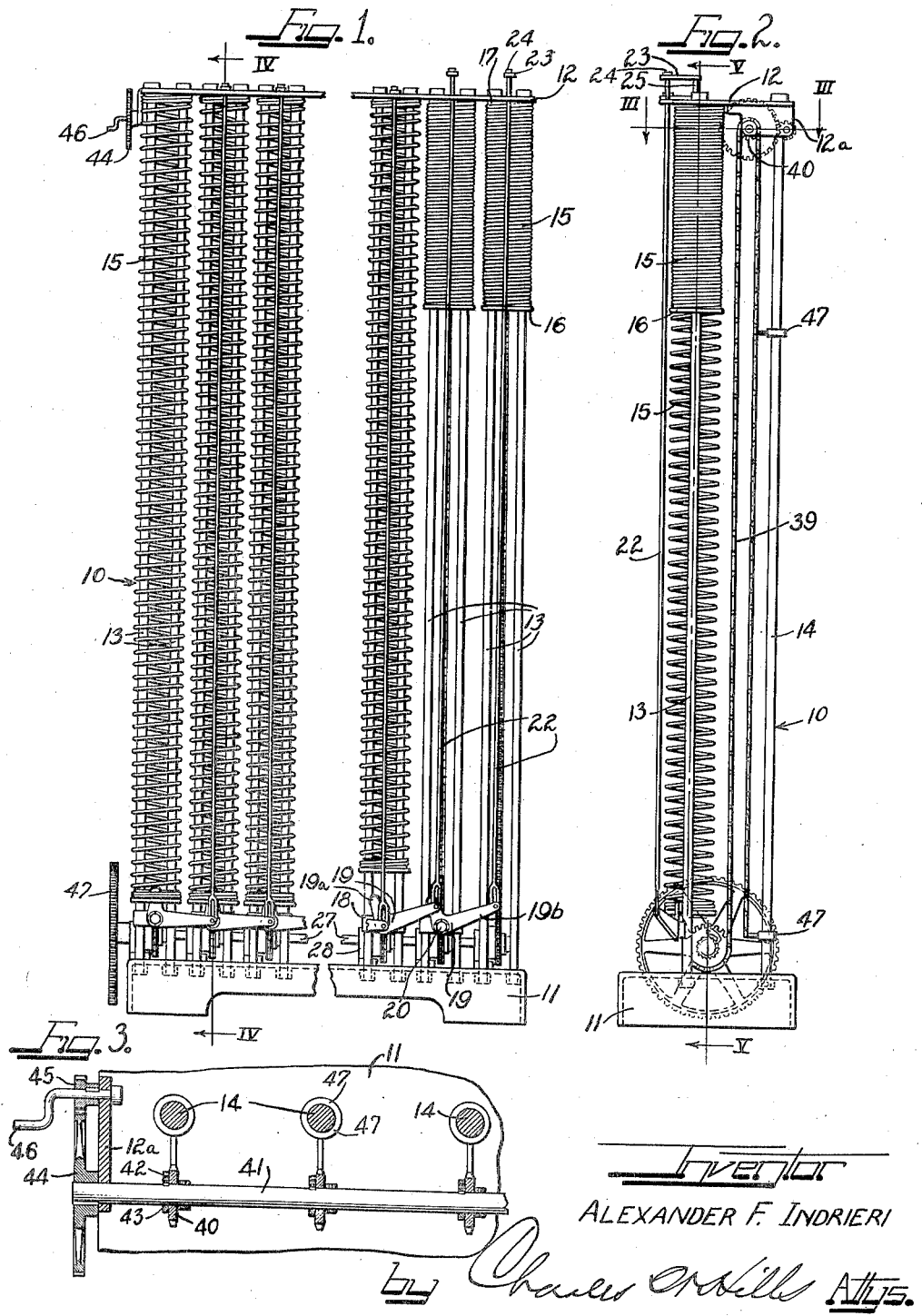

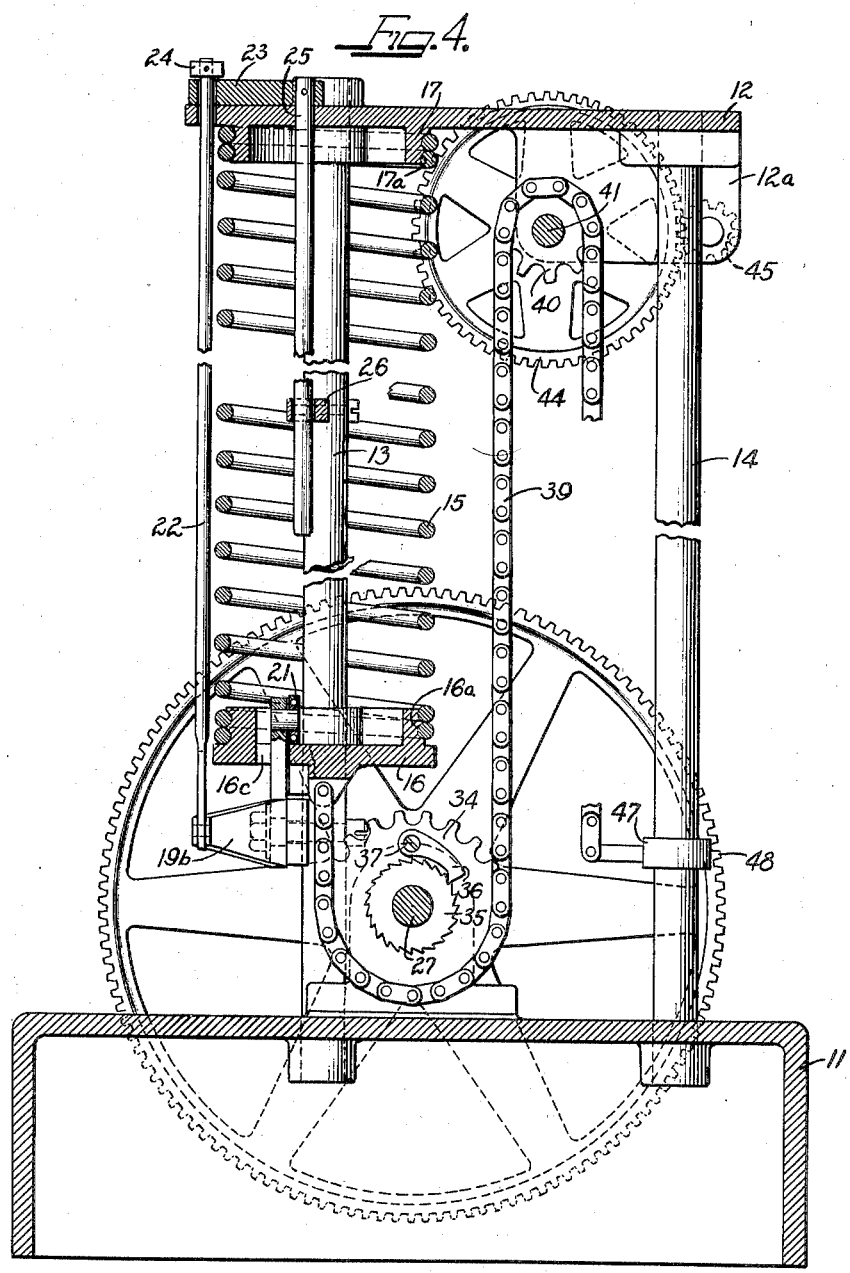

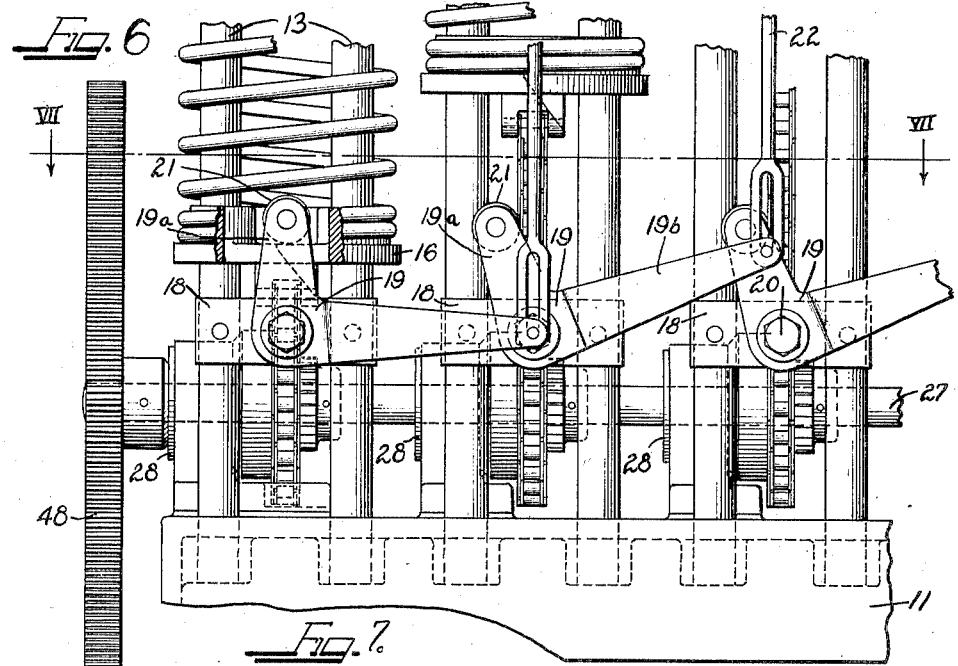
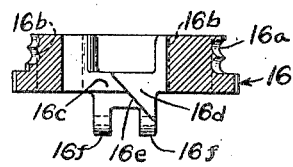
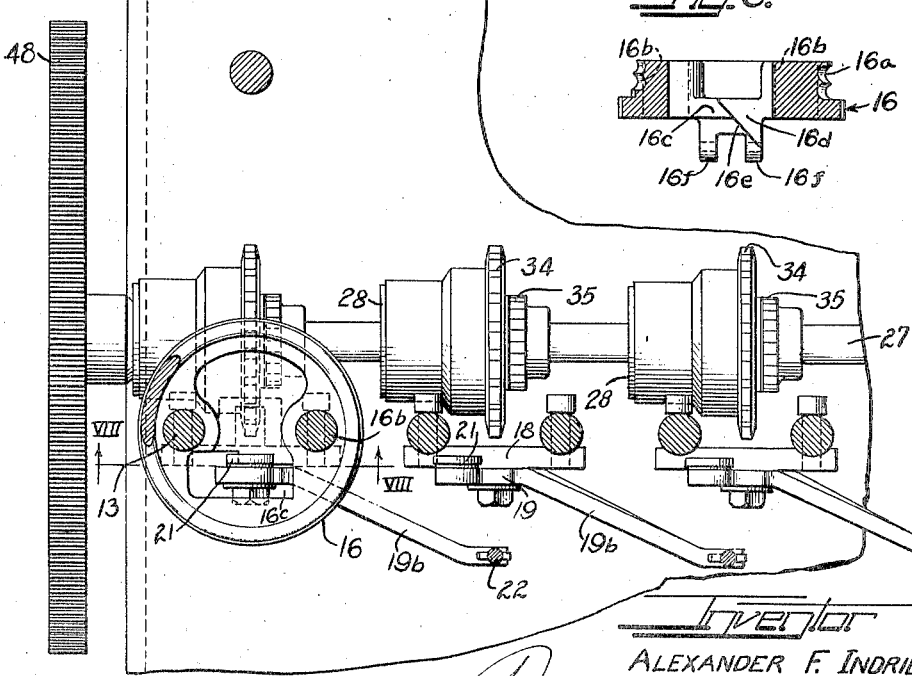

Patented Nov. 19, 1940

2,222,100

UNITED STATES PATENT OFFICE 2,222,100

SPRING MOTOR

Alexander F. Indrieri, Chicago, Ill.

Application May 1, 1939, Serial No. 271,047

12 Claims. (Cl. 185—37)

This invention relates to spring-actuated motors and more particularly relates to spring motors having a plurality of extensible helical springs delivering power in sequence to a drive shaft as they are released to move to unstressed positions.

The spring motors of this invention are well adapted for the driving of compressors in mechanical-type refrigerators, but are not limited to such use.

According to this invention, a series of extensible helical springs are stretched to an extended position. In this extended position they are stressed and exert forces permitting them to assume unstressed contracted positions. These forces are translated into rotating power for driving a shaft. In order to drive the shaft for prolonged periods of time, each spring acts separately on the shaft. Automatic control means are provided for sequentially releasing a stretched spring to rotate the shaft as soon as the energy of the previously operating spring is spent.

The springs can be stretched separately, in multiples, or simultaneously, by rotation of a winding shaft.

A feature of the invention is the mounting of the drive shaft for free rotation in stationary bearing blocks which carry spring-stressed sprocket wheels so that only rotating power is delivered to the shaft.

It is, then, an object of this invention to provide a spring motor actuated by stressed extensible springs.

A further object of this invention is to provide a spring motor capable of developing rotating power from the contraction of stretched helical springs.

A further object of the invention is to provide a tension spring motor including a plurality of extensible helical springs which sequentially operate to rotate a shaft.

A specific object of the invention is to provide a tension spring motor including a plurality of extensible helical springs which can be stretched to an elongated position and sequentially released from this position to rotate a shaft over a prolonged time interval.

Another object of the invention is to provide automatic releasing and locking means for stretched springs in a tension spring motor so that each spring will deliver its power in sequence.

Other and further objects of the invention will become apparent to those skilled in the art from the following detailed description of the annexed sheets of drawings, which disclose a preferred embodiment of the invention.

On the drawings:

Figure 1 is a broken side elevational view of a tension spring motor according to this invention.

Figure 2 is an end elevational view of the motor shown in Figure 1.

Figure 3 is a fragmentary horizontal cross-sectional view taken along the line III—III of Figure 2 with parts in elevation.

Figure 4 is an enlarged broken vertical cross-sectional view, with parts in elevation, taken along the line IV—IV of Figure 1.

Figure 5 is an enlarged broken vertical cross-sectional view taken along the line V—V of Figure 2.

Figure 6 is a fragmentary enlarged side elevational view of a portion of the machine shown in Figure 1.

Figure 7 is a cross-sectional view, with parts in elevation, taken along the line VII—VII of Figure 6.

Figure 8 is a horizontal cross-sectional view taken along the line VIII—VIII of Figure 7, with parts omitted.

As shown on the drawings:

In Figures 1 and 2 the reference numeral 10 designates generally a tension spring motor according to this invention. The spring motor 10 comprises a frame built up from a base plate 11, a top plate 12, pairs of front side vertical rods 13 and a plurality of rear side vertical rods 14 holding the plates in spaced vertical relation.

Extensible helical springs 15 envelop each pair of rods 13. These springs, in their unstressed positions, are materially shorter than the length of the rods 13.

The springs on the rods 13 are secured at one end to end caps 16 slidable on the rods and at the other end are secured to stationary bosses 17 formed on the bottom side of the top plate 12 as best shown in Figures 4 and 5. The slidable caps 16 have grooves 16a in the side walls thereof for receiving the bottom end coils of the helical springs 15. Likewise, the bosses 17 have grooves 17a in their side walls to receive the top end coils of the springs. The springs are thus locked at their top ends on the bosses 17 and at their bottom ends on the slidable caps 16.

As best shown in Figures 4, 5, 7 and 8, each end cap 16 has a pair of vertical bores 16b therethrough for receiving a pair of rods 13. The bottom of each cap 16 is apertured at 16c as best shown in Figures 7 and 8. A dependent leg 16d extends from the bottom of each cap 16 and has an upwardly sloping bottom edge 16e extending to the aperture 16c as shown in Figure 8.

As best shown in Figure 5, a pair of dependent ears 16f extend downwardly from the central portion of each cap 16.

As shown in Figure 1, each pair of rods 13, except the pair at the right end, has a bracket 18 thereon and bridging the spaces therebetween. The brackets 18 are near the bottoms of the rods 13 but are in spaced relation above the base plate 11. Bell cranks 19 are pivotally connected to the mid-point of each bracket 18 by means of bolts such as 20.

Each bell crank 19 has an upwardly extending arm portion 19a carrying a roller 21 at its end. The rollers 21 are aligned with the leg 16d of the cap 16 and are adapted to ride up the inclined edge 16e into the aperture 16c of the cap.

Each bell crank 19 also has a longer offset arm portion 19b extending outwardly and forwardly of the rods 13 on which the bell crank is carried as best shown in Figures 6 and 7. The weight of each arm 19b is sufficient to tilt the bell crank for moving the roller 21 over on the solid bottom portion of the cooperating cap 16. The ends of the arms 19b are aligned with a preceding spring 15 and are slidably connected to vertical link rods 22 extending upwardly through the top plate 12 as best shown in Figures 1 and 2.

The link rods 22 also extend freely through bars 23 resting on top of the top plate 12. Abutment heads such as 24 (Figure 4) are secured on the top ends of the link rods 22 to prevent the rods from being pulled through the bars 23. The other ends of the bars 23 are secured rigidly to the top ends of vertical slip rods 25 extending in slidable relation through the top plate 12 and through guide bosses 26 carried between the pairs of vertical rods 13 on brackets 27 (Figure 5). The lengths of the slip rods 25 are greater than the lengths of the springs 15 in their fully collapsed position so that, as the slidable caps 16 are pulled up by the contracting springs, the same will thrust against the bottom ends of the slip rods 25 to raise the same. This will cause a lifting of the link rod 22 to trip the bell crank 19 controlled thereby for moving the roller 21 off of the bottom of the next adjacent cap 16 therebetween by releasing the next spring 15.

A drive shaft 27 is rotatably mounted on the base 11 in a plurality of stationary bearing blocks 28 mounted in front of each pair of rods 13.

As best shown in Figure 5, each bearing block 28 has a horizontal bore 29 therethrough of larger diameter than the diameter of the drive shaft 27. One end of the bearing block 28 is countersunk as at 30 for receiving an anti-friction bearing 31 therein to rotatably carry the drive shaft.

The bearing block 28 has a reduced cylindrical portion 32 providing an inner race for roller bearings 33. A sprocket gear 34 is rotatably mounted around the portion 32 of the bearing block 28 on the rollers 33.

A ratchet gear 35 is pinned on the shaft 27 and is mounted adjacent to each sprocket gear 34. A pawl 36 is pivotally connected to a side face of the sprocket gear 34 by means of a screw or bolt 37 (Figure 4).

The drive shaft 27 is therefore freely rotatable in the bearing blocks 28 and is operatively connected with rotatable sprocket gears 34 carried by the bearing blocks through a ratchet and pawl connection.

The depending ears 16f of the caps 16 have pins 38 mounted therein and bridging the space therebetween. Each pin 38 extends through an end link of a roller chain 39 as best shown in Figure 5.

Each roller chain 39 is trained around the corresponding sprocket gear 34 as shown in Figures 4 and 5 and thence upwardly and around a corresponding sprocket gear 40. The sprocket gears 40 are freely rotatable around a winding shaft 41 rotatably carried by end legs 12a of the top frame plate 12 as shown in Figures 3 and 4.

Each sprocket gear 40 carries a pawl 42 adapted to engage a ratchet gear 43 pinned to the shaft 41.

One end of the shaft 41 has a large gear 44 keyed or pinned thereon. The gear 44 meshes with a smaller spur gear 45 adapted to be manually rotated by a crank 46.

The pawls 42 can be manually thrown in and out of operation so that a rotation of the shaft 41 through manual operation of the crank 46 can rotate any one or all of the sprocket gears 40.

The other ends of the chains 39 have bosses 47 secured thereon. These bosses 47 are disposed around the rear rods 14 and slide on these rods.

A rotation of the winding shaft 41 will effect a movement of one or more sprocket gears 40 to pull one or more chains 39 around the sprocket gears 34. These sprocket gears 34 can rotate freely without rotating the drive shaft 27 because the pawls 36 carried thereby will merely click around the ratchet gears 35 without moving the gears.

The helical springs 15 will thus be stretched into an extended position because a rotation of the sprocket gears 34 will decrease the length of the run of the chain between the bottom caps 16 and the gears.

As the end caps 16 are moved downwardly toward the bell cranks 19, the rollers 21 carried by the bell cranks will contact the sloping edge 16e and be guided through the apertures 16c of the caps. As soon as the rollers clear the apertures 16c, the weight of the bell crank arms 19b will move the rollers over on top of the bottoms of the caps 16 and thus lock the springs in stretched position. The link rods 22 have elongated slots in the ends thereof receiving the bell crank arms 19b so that free gravity movement of the bell crank is permitted in any position prior to an upward movement of the link rod through operation of the end caps on the slip rods 25.

Since the first spring 15 of the machine does not have a bell crank 19 for locking the same in stretched position, it will start to contract and pull its chain 39 upwardly thereby causing a rotation of the drive shaft 27 through the sprocket gear 34 and pawl and ratchet connections 35 and 36. This first spring will continue to contract and drive the shaft 27 independently of the other springs until its end cap 16 thrusts against the first slip rod 25 to raise the rod. The adjacent link rod 22 will thus be raised to move the arm 19b of the adjacent bell crank 19 upward. An upward movement of the bell crank arm 19b will pivot the bell crank to move the roller 21 carried on the arm 19a into the aperture 16c of the end cap for the second helical spring. As soon as this roller is free to move through the aperture 16c, the second spring will start to contract and carry on the rotation of the drive shaft.

The second spring, in turn, will effect the operation of the third spring as soon as it has reached a contracted position for operating its slip rod. In this manner each helical spring 15 is operated in sequence from a stretched to a contracted position. The sprocket gears 40 on the winding shaft 41 can be controlled so that any one of the contracted springs can be stretched and made ready for operation. The operation of the winding shaft is thereby made easy since it is not necessary to stretch all of the springs simultaneously.

One end of the drive shaft 27 has a gear 48 pinned thereon. This gear 48 can mesh with any member to be driven. If desired, a brake can be mounted on the machine for locking the drive shaft 27 against rotation until it is desired to operate the machine.

The sequential operation of the springs will effect a substantially uniform rotation of the drive shaft over a prolonged time interval.

While a stretched spring exerts an upward pull on the sprocket gear 34 through the roller chain 39, this pull is not transmitted to the drive shaft since the sprocket gears are independently mounted on the bearing blocks 28. The drive shaft is therefore free to rotate even when all of the springs are stretched. The pawl 36 on each sprocket gear 34 drives its ratchet wheel 35 only in the one direction caused by an upward movement of the chain 39 as it is pulled by the stretched spring. A reverse movement of the chain caused by operation of the winding shaft does not affect a movement of the drive shaft since the pawl on the rotating sprocket 34 will merely click around the ratchet wheel.

Likewise, the movement of the sprocket wheels 34 during the rotation of the drive shaft will cause a downward pull on the run of the chain extending up to the sprocket gears 40. However, these sprocket gears 40 rotate freely around the winding shaft 41 and the pawls 42 carried thereby will only click around their ratchet gears 43.

It should be understood that the winding shaft can be rotated through other than a manual crank. For example, a motor can be used to drive the winding shaft whenever the spring power is dissipated.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A spring motor comprising a plurality of axially extensible helical springs, means for stressing said springs from their neutral positions, a plurality of gears mounted adjacent said springs, a shaft operatively connected to said gears, and flexible means connecting one end of each spring with the adjacent gear to rotate the shaft as the springs move from their stressed positions.

2. A spring motor comprising a plurality of helical springs, means for fixedly mounting one end of said springs, flexible means secured to the free ends of said springs, means for actuating the flexible means to axially stretch the springs, means for locking the springs in stretched position, a drive shaft rotated by said flexible means and means for sequentially releasing the locking means for individual operation of the stretched springs.

3. A spring motor comprising a plurality of spaced vertical helical springs, means anchoring the tops of said springs, means for moving the bottoms of the springs away from the tops to stretch the springs, a rotatable shaft, sprocket gears on said shaft having axes in transverse alignment with the axes of said springs, said sprocket gears receiving the means for stretching the springs therearound, and means for locking the springs in stretched position.

4. A spring motor comprising a plurality of extensible helical springs, vertical rods supporting said springs in spaced vertical relation, caps on one end of each spring slidable on said rods, a drive shaft, sprocket gears for rotating said drive shaft, and sprocket chains anchored on said caps and trained around said gears for rotating the shaft as the springs contract from a stretched position.

5. A spring motor comprising a base plate, a plurality of pairs of vertical rods extending upwardly from said base plate, a top plate carried by said rods, a helical spring enveloping each pair of rods, means anchoring the top ends of said helical springs to said top plate, a cap member slidable on each pair of rods and anchored to the spring enveloping said pair of rods, a flexible chain carried by each cap, a drive shaft, a plurality of sprocket gears on said shaft each in alignment with a spring, said chain trained around said sprocket gears, and a winding device to actuate said chain for stretching the springs whereby the stretched springs will pull the chain to rotate the sprocket gears and shaft.

6. A spring motor comprising a base plate, a plurality of pairs of vertical rods extending upwardly from said base plate, a top plate carried by said rods in spaced relation from the base plate, a helical spring enveloping each pair of rods, means anchoring the top ends of each spring to said top plate, a cap member slidable on each pair of rods and anchored to the free ends of each spring, a plurality of bearing housings mounted on said base plate, a drive shaft rotatably carried by said bearing housing, a plurality of sprocket gears rotatably carried by said bearing housings, pawl and ratchet devices connecting said sprocket gears with said drive shaft, and a sprocket chain trained around each sprocket gear and anchored to each spring for transmitting power from the stretched springs to rotate the shaft.

7. In a spring motor having a plurality of extensible helical springs for sequentially driving a shaft, the improvement which comprises a member carried by the free end of each spring, a bell crank device engageable with said member for locking the spring in a stretched position, and a push rod actuated by each spring as the same assumes a contracted position for moving an arm of said bell crank to release an adjacent stretched spring.

8. A spring motor comprising a plurality of helical springs, means anchoring one end of each of said springs, cap members anchored on the free end of each of the springs, said cap members having an aperture therethrough, a bell crank for each spring having an arm adapted for insertion through the aperture of said cap, a roller on the end of said arm for engagement with said cap to lock the same, a push rod actuated by each spring as the same assumes a contracted position, link means connecting said push rod with an arm of said bell crank to move the roller off of the end cap, and means for translating linear contracting movements of the stretched springs into rotating movements for driving a shaft.

9. In a spring motor of the extensible spring type the improvement which comprises a plurality of bearing blocks, a shaft extending through each of said bearing blocks in spaced relation therefrom, an anti-friction bearing in each of said blocks for freely rotatably mounting said shaft in the blocks, a sprocket gear rotatably mounted on each of said bearing blocks, ratchet wheels secured on said drive shaft adjacent each sprocket gear, a pawl on said sprocket gear for operating said ratchet wheel and chains driven by the springs for rotating the sprocket gears whereby spring tension cannot interfere with rotation of the shaft.

10. In a spring motor of the extensible tension spring type the improvement which comprises sprocket chains for stretching the springs of said motor, sprocket gears driven by said chains, a winding shaft, additional sprocket gears freely rotatable on said winding shaft, said additional sprocket gears receiving said chains therearound, and pawl and ratchet devices selectively connecting said sprocket gears with said winding shaft whereby any one or all of said chains can be actuated by the winding shaft.

11. In a motor for converting potential energy to kinetic energy, a driven shaft, and a plurality of resilient means for driving said shaft, each of said means changing in length as the potential energy stored therein changes, means for stressing the resilient means to store potential energy therein, tripping devices for locking said resilient means in a stressed position, and means actuated by the movement of each of said resilient means as the same assumes an unstressed position for releasing the tripping devices to allow unstressing of an adjacent stressed resilient means for continued driving of the shaft.

12. In a motor for converting potential energy to kinetic energy, a driven shaft, and a plurality of longitudinally extensible helical springs for sequentially driving said shaft, each of said springs changing in length with the potential energy stored therein, means for stressing the springs to store potential energy therein, tripping members for locking the springs in a stressed position, and means individually actuated by the movement of each of said springs as they assume an unstressed position for releasing the tripping members to allow unstressing of an adjacent stressed spring for continued driving of the shaft.

ALEXANDER F. INDRIERI.